LOCKING READ AMPLIFIER WITH BINARY STORAGE

Filed April 10, 1962 2 Sheets-Sheet 1

INVENTORS.
CHARLES H. FISCHER,
DONALD S. KELLY,
BY
Walter J. Adam
ATTORNEY

April 13, 1965 C. H. FISCHER ETAL 3,178,592

LOCKING READ AMPLIFIER WITH BINARY STORAGE

Filed April 10, 1962 2 Sheets-Sheet 2

INVENTORS.
CHARLES H. FISCHER,
DONALD S. KELLY,
BY
Walter J. Adam
ATTORNEY.

United States Patent Office 3,178,592
Patented Apr. 13, 1965

3,178,592
LOCKING READ AMPLIFIER WITH BINARY STORAGE

Charles H. Fischer and Donald S. Kelly, Los Angeles, Calif., assignors to Hughes Aircraft Company, Culver City, Calif., a corporation of Delaware
Filed Apr. 10, 1962, Ser. No. 186,373
5 Claims. (Cl. 307—88.5)

This invention relates to computer memory read amplifiers and particularly to an improved read amplifier that also performs the storage of binary information.

In order to utilize the low level signals derived from memory systems such as those having coincident current core arrangements, thin film arrangements, magnetic drum arrangements or tape arrangements, a multistage amplifier and strobing circuit is conventionally utilized. Because temporary storage of the amplified and sensed information is required, the multistage amplifier and strobing circuit is followed by a flip flop memory read register. A disadvantage of this conventional arrangement is that a great many components are required because of the separate amplifier stages and the storage register, which number of components is multiplied in a large computer system because a separate amplifying and storage arrangement is required for each bit of a stored word. Another disadvantage of this conventional arrangement is that variations in delay through the amplifier stages provide problems in establishing an exact strobe time. Also, large amplitude noise pulses on the input line may saturate the amplifier so as to cause unreliable interrogation of stored information.

It is therefore an object of this invention to provide an improved and simplified read amplifier circuit that performs both the functions of amplification and temporary storage in a single circuit arrangement.

It is a further object of this invention to provide a read amplifier circuit that is only enabled or energized in response to a strobe pulse so as to be relatively unaffected by noise signals on the sense lines.

It is a still further object of this invention to provide a circuit that has both the characteristics of a flip flop and of a high gain amplifier.

It is another object of this invention to provide a read amplifier and binary storage circuit that responds to relatively low level signals sensed from magnetic elements.

It is still another object of this invention to provide an improved read amplifier circuit that responds to differential sensed signals.

It is another object of this invention to provide an improved read amplifier circuit that responds to the presence or absence of a signal and has a threshold level so as to be substantially unaffected by noise transients.

Briefly in accordance with this invention, a controlled flip flop circuit including a pair of transistors is provided to be gated to a disabled or de-energized condition in response to the absence of an enabling signal. In the disabled condition both output signals are in the same logical state. At the strobe time, in response to an enabling signal, the flip flop is biased to an intermediate condition to be triggered to one of two stable states. During this intermediate condition when the circuit is enabled, the loop gain of the circuit is relatively high and in response to an informational signal causing a slight unbalance, the circuit is triggered to one of the two stable states. Thus, the circuit in accordance with this invention has the characteristics of a gate when disabled, the characteristics of a highly sensitive differential amplifier when initially enabled and the characteristics of a storage flip flop when triggered. The amplifier circuit in accordance with this invention is relatively insensitive to input signal transients both when disabled and when the circuit has been triggered to a stable state.

The novel features of this invention, both as to its organization and method of operation, will best be understood from the accompanying description, taken in connection with the accompanying drawings, in which like characters refer to like parts, and in which.

Figure 1:
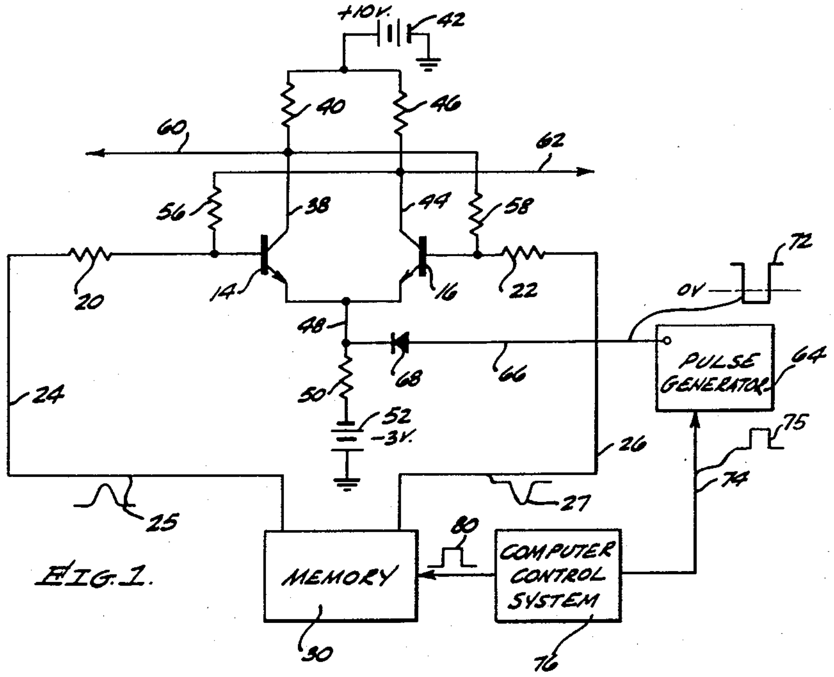
FIG. 1 is a schematic circuit diagram of one arrangement of a memory read amplifier in accordance with this invention for responding to differential input signals.

Referring first to the read amplifier circuit of FIG. 1 in accordance with this invention, a first transistor 14 and a second transistor 16 are provided both of the n-p-n types. The bases of the transistors 14 and 16 are respectively coupled through resistors 20 and 22 to respective leads 24 and 26 which in turn receive sensed signals from a memory circuit 30, for example. The memory circuit 30 may, for example, be a thin film memory system having a sense conductor passing through binary magnetic storage elements and connected at opposite ends to the leads 24 and 26 so as to apply respective pulses of opposite polarity thereto such as those of waveforms 25 and 27. This thin film memory system described above provides a balanced sensing arrangement. Also, the memory circuit 30 may be a magnetic drum or tape arrangement utilizing a balanced sensing arrangement as is well known in the art. It is to be noted that a similar circuit may be required for each sense line utilized in the memory 30.

The collector of the transistor 14 is coupled through a lead 38 and a resistor 40 to a suitable positive source of potential such as the positive terminal of a +10 volt battery 42, the negative terminal being coupled to ground. The collector of the transistor 16 is coupled through a lead 44 and in turn a resistor 46 to the positive terminal of the battery 42. The emitters of the transistors 14 and 16 are coupled to a common lead 48 which in turn is coupled through an impedance device such as a common emitter resistor 50 to a suitable negative source of potential such as the negative terminal of a −3 volt battery 52, the positive terminal thereof being coupled to ground.

In order to provide a cross coupling or regenerative feedback arrangement so as to develop the flip flop operation, a resistor 56 is coupled between the base of the transistor 14 and the lead 44 and a resistor 58 is coupled between the base of the transistor 16 and the lead 38. It is to be understood that other cross coupling arrangements may be utilized within the principles of this invention. The circuit has a first output lead 60 which may be coupled to the lead 38 and a second output lead 62 which may be coupled to the lead 44. For enabling the circuit in accordance with this invention to operate as a differential amplifier and a binary storage device, a pulse generator 64 is coupled through a lead 66 and in turn the anode to cathode path of a diode 68 to the lead 48. The pulse generator 64 may be any conventional pulse forming circuit and, for example, may include a saturating transistor at the output having a load current path coupled between suitable voltages such as +12 volts and −3 volts for forming the enabling pulse of a waveform 72 having an upper level of approximately +12 volts and a lower level of approximately −3 volts. The pulse generator 64 may respond to a timing signal of a waveform 75 applied thereto through a lead 74 from a computer control system 76. An interrogate timing pulse of a waveform 80 is also applied from the computer control system 76 to the memory 30 for initiating the formation of appropriate control, driving or switching pulses for the magnetic elements therein as is well known in the art.

Before further explaining the operation of the circuit of FIG. 1, the arrangement of the elements of the read amplifier circuit of FIG. 2 for responding to the presence or absence of a memory read signal in accordance with this invention, will be explained. The circuit includes a first transistor 84 and a second transistor 86 both of the n-p-n type with the transistor 84 having a collector coupled to a lead 87 which in turn is coupled through a resistor 88 to a suitable positive source of potential such as the positive terminal of a +6 volt battery 90 having a negative terminal coupled to ground. Also, the collector of the transistor 86 is coupled through a lead 94 and a resistor 96 to the positive terminal of the battery 90. A first output lead 98 is coupled to the lead 87 and a second output lead 100 is coupled to the lead 94, for example. The base of the transistor 84 is coupled to a junction point 102 through a resistor 104 and the base of the transistor 86 is coupled to a junction point 106 through a resistor 108. The cross coupling or regenerative feedback action is provided by an arrangement such as a resistor 110 coupled between the base of the transistor 84 and the lead 94 and a resistor 112 coupled between the base of the transistor 86 and the lead 87. The transistor 86 is provided with a bias by a current path from a suitable source of positive potential such as the positive terminal of a +12 volt battery 116 through a resistor 118, the junction point 106 and the anode to cathode path of a diode 120 to a junction point 122 coupled to the emitters of the transistors 84 and 86. The negative terminal of the battery 116 is coupled to ground.

The transistor 84 is provided with a bias by a suitable positive source of potential such as a +12 volt battery 126 having a negative terminal coupled to ground and a positive terminal coupled through a resistor 130 to the junction point 102. A winding 132 of a transformer 134 has first and second ends coupled through cathode to anode paths of diodes 136 and 138 to the junction point 102. The winding 132 is provided with a center tap coupled to a lead 140 which in turn is coupled through a threshold determining resistor 142, which may be variable, to the junction point 122. Thus, a bias is provided to the base of the transistor 84 by a current path from the battery 126 to the junction point 102 and in turn to the junction point 122. The transformer 134 has an input winding 146 having one end coupled to ground and the other end coupled to a lead 148 to which is applied a signal of a waveform 149. The lead 148 may receive the signal of the waveform 149 from a memory system similar to the memory 30 of FIG. 1 except that it is of the type wherein a given binary state is represented by either the presence or absence of an output signal.

The junction point 122 is coupled through the anode to cathode path of a diode 152 to a suitable positive source of potential such as the positive terminal of a +6 volt battery 154 having a negative terminal coupled to ground. Also, the junction point 122 is coupled to ground through the collector to emitter path of a transistor 158 of the n-p-n type having a base coupled to a lead 160. An enabling pulse of a waveform 164 is applied to the lead 160 from a source of pulses similar to the pulse generator 64 of FIG. 1 but arranged to provide a positive pulse. As will be discussed in further detail subsequently, the pulse of the waveform 164 biases the transistor 158 into conduction so that approximately ground potential is applied to the junction point 122 for enabling the amplifier circuit. It is to be noted that when the transistor 158 is biased out of conduction, the diode 152 is forward biased and a positive potential from the battery 154 is applied to the junction point 122 to disable the amplifier circuit.

Figure 3:
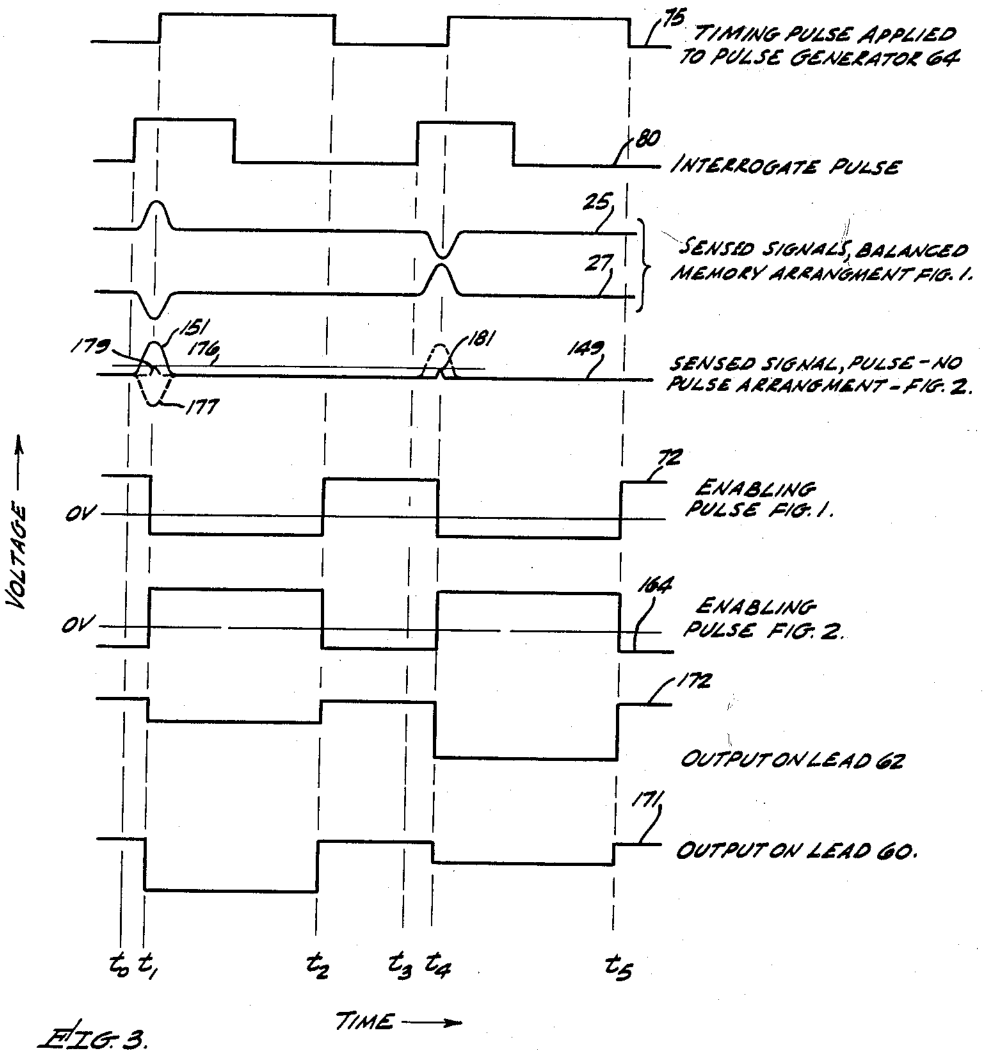
FIG. 3 is a schematic diagram of waveforms of voltage versus time for explaining the operation of the circuits of FIGS. 1 and 2.

Referring now to FIGS. 1 and 3, the locking read amplifier in accordance with this invention will be explained in further detail. The enabling pulse of the waveform 72 at a time $t_0$ has a positive level such as +12 volts and is applied through the diode 68 to the lead 48 so that approximately +11 volts is maintained at the emitters of the transistors 14 and 16. Because the battery 42 is selected at +10 volts, the transistors 14 and 16 are maintained biased out of conduction and the high level voltages of the waveforms 171 and 172 are applied to respective output leads 60 and 62. Thus, the read amplifier is disabled and substantially unaffected by noise or undesired signals which may appear on the leads 24 and 26. At the time $t_0$, an interrogate pulse of the waveform 80 is applied from the computer control system 76 to the memory 30 which may be a thin film arrangement or a rotating drum system, for example. When a magnetic element therein is interrogated or switched, a positive sensed signal of the waveform 25 may be applied to the lead 24 and a negative sensed signal of the waveform 27 may be applied to the lead 26 shortly before a time $t_1$. At the time $t_1$, while the sensed signals of the waveforms 25 and 27 are applied to the bases of the transistors 14 and 16, the pulse generator 64 responds to the timing pulse of the waveform 75 to form the enabling pulse of the waveform 72 which falls to approximately −3 volts and biases the diode 68 out of conduction. Thus, the potential of approximately +11 volts is removed from the lead 48 and the voltage of the lead 48 goes to approximately ground as current flows to the −3 volts of the battery 52. Therefore, an intermediate state is formed with both transistors biased negative at the emitters thereof and neither transistor biased into conduction. Both transistors 14 and 16 in this intermediate state have a tendency to conduct.

In response to the unbalanced condition created by the positive potential of the waveform 25 and the negative potential of the waveform 27, the transistor 14 is rapidly biased into conduction because of the regenerative action through the resistor 56. In this unstable intermediate state, both transistors 14 and 16 are attempting to turn on and the voltage dividing action such as between the resistors 58 and 40 determines the collector voltage such as on the lead 38 and the collector voltage falls slightly. Because of the positive voltage at the base of the transistor 14, the voltage on the lead 38 decreases which in turn decreases the voltage on the base of the transistor 16. This voltage decrease in turn increase in turn increases the voltage on the lead 44 and thus increases the voltage on the base of the transistor 14 to rapidly bias that transistor into conduction. Thus, at time $t_1$ the negative potential from the battery 52 is applied through the transistor 14 to the output lead 60 as shown by the waveform 171. Also, at time $t_1$ the transistor 16 remains nonconductive and only a small negative drop resulting from the voltage dividing action of resistors 46 and 56 is applied to the output lead 62 as shown by the waveform 172. After the circuit is triggered to this state at time $t_1$, it effectively becomes a bistable flip flop storing the binary condition represented by the waveforms 171 and 172. Shortly after time $t_1$ the interrogating pulse of the waveform 80 falls to its lower level.

A given binary state is thus stored in the read amplifier for a period between times $t_1$ and $t_2$ during which time the information is utilized by logical arrangements of the computer control system 76, for example, as is well known in the art. It is to be noted that after time $t_1$ when the transistors 14 and 16 are in a stable state, very large transients from the memory 30 can be tolerated without disturbing the stored state. At time $t_2$, the enabling pulse of the waveform 72 is terminated in response to the timing pulse of the waveform 75 and rises to the upper level which may be +12 volts. The diode 68 is again biased into conduction to apply approximately +11 volts to the lead 48. Thus, the two transistors 14 and 16 are biased out of conduction and the circuit is again disabled. Because the transistors 14 and 16 are non-conductive in this disabled condition, the output signal on the leads 60 and 62 are both at the high levels as shown by respective waveforms 171 and 172. During this disabled condition, the amplifier circuit is relatively insensitive to noise or other undesired signals which may appear on the leads 24 and 26.

At a time $t_3$, which may be determined by the time required by the computer control system 76 to utilize the information previously read from the memory 30 and to write new information into the memory 30, an interrogate pulse of the waveform 80 is applied from the computer control system 76 to the memory 30. Shortly after time $t_3$, as a magnetic storage element of the memory 30 is switched toward an opposite magnetic state, signals of the waveforms 25 and 27 are applied to respective leads 24 and 26. It is to be noted that in the example shown in FIG. 3, the signal of the waveform 25 is negative and the signal of the waveform 27 is positive shortly after time $t_3$ representing an opposite stored magnetic state from that previously interrogated. The polarity of the sensed signals at time $t_1$ may represent a binary "one" and the polarity of the sensed signals formed after time $t_3$ may represent a binary "zero," for example.

At time $t_4$ in response to the timing pulse of the waveform 75, the pulse generator 64 applies the negative enabling pulse of the waveform 72 to the lead 66 biasing the diode 68 out of conduction. The voltage on the lead 48 falls to approximately ground potential under the influence of the battery 52 and resistor 50. Thus, the circuit is in an unstable intermediate state with both transistors 14 and 16 being capable of being turned on. When the circuit of FIG. 1 is enabled, it is to be noted that in response to the voltage drop at the lead 48, the potential at the bases of the transistors 14 and 16 drops because of the change of voltage on the lead 48. Also, when the circuit is disabled, the potential at the bases of the transistors 14 and 16 increases because of the increase of voltage on the lead 48. However, these voltage changes do not affect the operation of the circuit because the voltage changes are equal on the bases of both of the transistors 14 and 16. The potentials of the waveforms 25 and 27 unbalances the circuit in this intermediate state so that the transistor 16 is rapidly biased into conduction with the transistor 14 remaining non-conductive. The high loop gain in this intermediate state results in only slight unbalances or small signal levels determining the final binary state. The output signal on the lead 60 drops slightly, as shown by the waveform 171 and the output signal on the lead 62 falls to the low voltage level as shown by the waveform 172 representing a second stable storage state. Between times $t_4$ and $t_5$, the amplifier circuit is again utilized for storing information which may be used by the control system 76.

Shortly after time $t_4$, the interrogate pulse of the waveform 80 is removed. At time $t_5$, the timing pulse of the waveform 75 is terminated and the enabling pulse of the waveform 72 rises to the high potential level so that the read amplifier is again disabled. Because the transistors 14 and 16 are biased out of conduction, the signals of the waveforms 171 and 172 are both at the high voltage level. The operation may continue in a similar manner as that discussed above and will not be explained in further detail. It is to be noted that the timing and width of the pulses of FIG. 3 are for purposes of illustrating the operation of the invention and other pulse widths and timing arrangements may be utilized in accordance with the principles of this invention.

Figure 2:
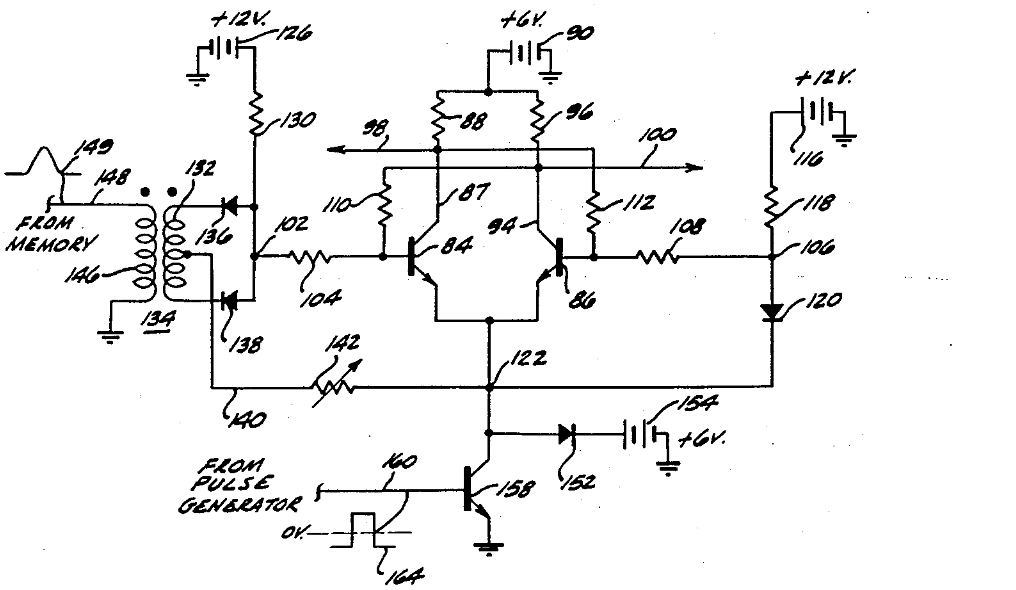
FIG. 2 is a schematic circuit diagram of another arrangement of a memory read amplifier circuit in accordance with this invention for responding to the presence or absence of an input signal.

Referring now to FIG. 2 as well as to FIG. 3, the read amplifier of FIG. 2 responds to the presence or absence of a pulse of the waveform 149 which, for example, may be derived from a core of a coincident current selection memory as is well known in the art. At the time $t_0$, in the absence of the enabling pulse of the waveform 164 being applied to the lead 160, that is, the low level potential is applied to the base of the transistor 158, the transistor 158 is maintained biased out of conduction. Thus, current flows from the battery 116 through the resistor 118 and diode 120 to the junction point 122 and through the diode 152 to the +6 volt battery 154. Also, current flows from the battery 126 through the resistor 130, through the diodes 136 and 138 and the winding 132 to the lead 140 and in turn through the resistor 142 to the junction point 122 and through the diode 152 to the battery 154. Because the diode 152 is forward biased, approximately +7 volts is maintained at the junction point 122 and the transistors 84 and 86 are maintained biased out of conduction, the read amplifier being in the disabled condition. At the time $t_0$, a positive output signal is maintained on the lead 98 similar to the waveform 172 and a positive output signal is maintained on the lead 100 similar to the waveform 171, being applied thereto from the battery 90.

At time $t_0$ in response to an interrogate pulse such as the waveform 80, a core, for example, of a memory system may be switched shortly after time $t_0$ to an opposite magnetic state to form a signal of the waveform 149. A positive signal 151 (FIG. 3) at time $t_1$ of the waveform 149 may represent a binary "one," for example, resulting from a core or magnetic element being switched to an opposite magnetic state. The substantially constant level signal of the waveform 149 resulting from the absence of a signal during the switching operation is shown dotted at time $t_1$ and may represent a binary "zero" or the core being in the opposite magnetic state from that representing a binary "one." The lead 148 may be coupled to one end of a sense lead (not shown) to form a pulse of a single polarity. Also, it is to be noted that both the positive pulse 151 and a negative pulse 177 may be obtained from some memory arrangements to represent an interrogated binary "one."

At time $t_1$, an enabling pulse of the waveform 164 is applied to the lead 160 as explained relative to FIG. 1 and the transistor 158 is biased into conduction to apply approximately ground potential, for example, to the junction point 122 so as to bias the diode 152 out of conduction. Thus, the circuit is in an intermediate state with both transistors 84 and 86 non-conductive and ground potential applied to the emitters thereof so that both transistors have a tendency to conduct. Prior to this intermediate state or prior to time $t_1$, the potential at the junction point 106 is determined by the voltage divider action of the resistor 118, the diode 120 and the diode 152 between the +12 volts of the battery 116 and the +6 volts of the battery 154. Also, the potential at the junction point 102 is determined by the voltage division of the resistor 130, the diodes 136 and 138, the resistor 142 and the diode 152 between the +12 volts of the battery 126 and the +6 volts of the battery 154. The resistors 118 and 130 and the diodes 120, 136 and 138 are selected to have impedances such that the potential applied to the junction points 102 and 106 are similar except for the voltage drop across the resistor 142. It is to be noted that the impedances of the diodes 120, 136 and 138 vary in a similar manner in response to temperature changes. Thus, prior to application of the signal of the waveform 149, the potential at the junction point 102 is more positive or at a higher level than that at the junction point 106 by a few millivolts as determined by the resistor 142. This small voltage drop across the resistor 142 develops a potential difference between the bases of the transistors 84 and 86 and provides a threshold level as will be explained subsequently.

At time $t_1$, when the circuit is in the unstable intermediate state, the positive signal 151 of the waveform 149 is substantially at a peak amplitude and a negative signal is applied to the junction point 102 through the rectifier arrangement of the diodes 136 and 138 to cause the transistor 86 to rapidly go into conduction because of the regenerative action of the cross coupling connections. The positive signal 151 of the waveform 149 is applied through the winding 132 and because of the center tap is positive at the cathode of the diode 136 and negative at the cathode of the diode 138 biasing the diode 138 into conduction. Thus, the voltage at the base of the transistor 84 falls below the voltage at the base of the transistor 86 and the transistor 86 is rapidly biased into conduction.

It is to be noted that a threshold level 176 must be overcome by the signal 151 of the waveform 149 so that the voltage at the junction point 102 is below the voltage at the junction point 106. The resistor 142 is variable so that a desired threshold level such as 176 may be selected. Thus, in the absence of a signal, noise such as shown by a dotted signal or spike 179 does not trigger the transistor 86 into conduction because of the unbalance caused by the voltage at the junction point 102 being more positive than at the junction point 106. As this positive voltage at the junction point 102 is not overcome by a spike 179, the transistor 84 goes into conduction in the absence of a signal of the waveform 149 which represents a binary "zero."

In certain types of memory arrangements, the sensed signal may be either positive or negative and a negative signal such as the dotted signal 177 may be applied to the lead 148. Because of the arrangement of the winding 132, a negative signal is applied to the cathode of the diode 136 and a positive signal is applied to the cathode of the diode 138 in response to the signal 177 of the waveform 149. As a result, a negative signal is applied through the diode 136 to the junction point 102. Thus, the operation is similar to that discussed above, in response to the presence of a sensed signal which may be either positive or negative.

Therefore, at time $t_1$ in response to the signal 151, the circuit of FIG. 2 changes from the intermediate state to a storage state with the transistor 86 conducting and the transistor 84 being non-conductive to form a low level signal on the lead 100 similar to the waveform 171 and a positive signal on the lead 98 similar to the waveform 172. Shortly after time $t_1$, the interrogate pulse similar to the waveform 80 may be terminated. At time $t_2$, which is the end of the binary storage condition, the enabling pulse of the waveform 164 is removed and falls to the lower voltage level to bias the transistor 158 out of conduction. Current flows from the junction point 122 through the diode 152 and the circuit is maintained in the disabled condition. The two transistors 84 and 86 are biased out of conduction, and the potential on the leads 98 and 100 rises to the high level similar to the waveforms 172 and 171.

At time $t_3$, an interrogate pulse similar to the waveform 80 may be applied to a suitable memory system (not shown) and shortly thereafter, a signal of the waveform 149 may be sensed on the lead 148, being at a low level representing the absence of a signal except for a small noise spike 181. As is well known, a small disturbance of the magnetic storage element may cause the formation of the spike 181. As discussed above, this absence of a signal may represent a stored "zero." A dotted signal is also shown shortly after the time $t_3$ to indicate that either a signal or the absence of a signal may be sensed. Because the voltage of the spike 181 is less than the threshold level 176, the potential at the junction point 102 is greater than the potential at the junction point 106. As discussed above, the potential difference between the bases of the transistors 84 and 86 caused by the voltage drop across the resistor 142 determines the threshold level 176.

At time $t_4$, the enabling pulse of the waveform 164 rises to the higher level and is applied to the base of the transistor 158 biasing that transistor into conduction and applying ground potential to the junction point 122. The amplifier of FIG. 2 is thus in the temporary intermediate condition with ground potential at the emitters of the two non-conducting transistors 84 and 86. Because the junction point 102 is at a higher potential than the junction point 106, the transistor 84 is biased into conduction at time $t_4$ and a signal similar to the waveform 172 is applied to the output lead 98. The circuit at time $t_4$ responds to the unbalanced condition with a high gain or sensitivity. The signal at the output lead 100 will be similar to that of the waveform 171. Shortly after time $t_4$, the interrogating pulse similar to the waveform 80 may be terminated. Between times $t_4$ and $t_5$, the amplifier is a binary storage flip flop and the above described cycles of operation may be repeated at time $t_5$. Because of the rectifying action of the diodes 136 and 138, the threshold levels 176 applies to both positive and negative noise spikes such as 181 and the transistor 84 is rendered conductive as long as the threshold level is not exceeded. Changes of voltage at the bases of the transistors 84 and 86 resulting from enabling and disabling the circuit are similar at the bases of both transistors and do not affect the above described operation, as discussed relative to FIG. 1.

It is to be noted that although specific types of transistors have been shown in FIGS. 1 and 2 for purposes of illustration, opposite types may be utilized in accordance with well known principles and are included within the scope of this invention. Because the circuit is disabled except during the intermediate condition and is in a stable state when triggered into a binary state, the amplifier does not saturate due to extraneous signals from the memory, thus allowing the strobe time such as times $t_1$ and $t_4$ to be such that the informational signal is always sampled at the proper time. Therefore, the circuit in accordance with this invention provides a high degree of reliability. Although the read amplifiers have been explained operating with a computer memory, it is to be understood that the circuits in accordance with this invention may be utilized whenever two state information is required to be processed.

The high gain amplifiers in accordance with this invention have been found to respond to sensed signals having a level as low as 5 millivolts, thus eliminating the requirements of preamplifying stages. The threshold arrangement of FIG. 2 allows selection of a level by varying the resistor 142 so that erroneous triggering from noise signals is substantially eliminated.

Thus, there has been described a locking read amplifier that has a disabled condition, an intermediate condition during which it is highly sensitive or has a high gain in response to an input signal, and a bistable storage condition. The read amplifier operates in response to a gating arrangement both as a high gain differential amplifier and a memory read flip flop or register to greatly reduce the required number of components. Because of the arrangement of the circuit and the disabling operation, the read amplifier is relatively insensitive to noise signals and to time delays therein. The read amplifier in accordance with this invention operates in response to systems reading the presence or absence of a signal and to systems reading balanced sense signals.

What is claimed is:

1. A circuit comprising: first and second transistors each having an emitter electrode, a base electrode, and a collector electrode; trigger means coupled to the base electrode of at least said first transistor for applying a trigger signal thereto; first impedance means coupled between the base electrode of said first transistor and the collector electrode of said second transistor; second impedance means coupled between the base electrode of said second transistor and the collector electrode of said first transistor; the emitter electrodes of said first and second transistors being coupled together; enabling means including a diode coupled to the common emitter electrodes of said first and second transistors for selectively biasing said transistors to a steady state condition in which both transistors are non-conductive when said diode is conductive and to a transient condition in which either one of said transistors is capable of being rendered conductive by said trigger signal when said diode is non-conductive; and pulsing means coupled to said trigger means and to said diode for operating said enabling means to render said diode non-conductive and place said first and second transistors in said transient condition and substantially simultaneously energizing said trigger means to bias said transistors such that only one of said transistors is rendered conductive as determined by said trigger signal.

2. A circuit comprising: first and second transistors each having a load current path and a control terminal, trigger means coupled to the control terminals of said first and second transistors for normally maintaining a potential difference of a preselected value between said control terminals and in response to a pulsing signal for applying a trigger signal to the control electrode of one of said first and second transistors, feedback means coupled between the load current path of said first transistor and the control terminal of said second transistor and between the load current path of said second transistor and the control terminal of said first transistor, enabling means coupled to the load current paths of said first and second transistors for selectively biasing said transistors to a steady state condition in which both transistors are non-conductive and to a transient condition in which either one of said transistors is capable of being rendered conductive by said trigger signal, and pulsing means for operating said enabling means to place said first and second transistors in said transient condition and substantially simultaneously energizing said trigger means to bias said transitsors such that one of said transistors is rendered conductive if the magnitude of said trigger signal exceeds said preselected value and the other of said transistors is rendered conductive if the magnitude of said trigger signal does not exceed said preselected value.

3. A circuit comprising: first and second transistors each having an emitter electrode, a base electrode, and a collector electrode; trigger means coupled to the base electrodes of said first and second transistors for normally maintaining a potential difference of a preselected value between said base electrodes and in response to a pulsing signal for applying a trigger signal to the base electrode of said first transistor; first impedance means coupled between the base electrode of said first transistor; and the collector electrode of said second transistor; second impedance means coupled between the base electrode of said second transistor and the collector electrode of said first transistor; the emitter electrodes of said first and second transistors being coupled together; enabling means including a third transistor having a base electrode and having a load current path coupled to the common emitter electrodes of said first and second transistors for selectively biasing said transistors to a steady state condition in which both transistors are non-conductive and to a transient condition in which either one of said transistors is capable of being rendered conductive by said trigger signal; and pulsing means coupled to said trigger means and to the base electrode of said third transistor for operating said enabling means to place said first and second transistors in said transient condition and substantially simultaneously energizing said trigger means to bias said preselected value and said first transistor is rendered conductive if the magnitude of said trigger signal exceeds said preselected value and said first transistor is rendered conductive if the magnitude of said trigger signal does not exceed said preselected value.

4. A circuit according to claim 3 wherein said trigger means includes a transformer having a primary winding and a secondary winding, first and second diodes coupled in like polarity between the respective ends of said secondary winding and the base electrode of said first transistor, and resistive means coupled between a tap on said secondary winding and said common emitter electrodes of said first and second transistors.

5. A circuit comprising: first, second and third transistors each having an emitter electrode, a base electrode and a collector electrode; the emitter electrodes of said first and second transistors being coupled together and to the collector electrode of said third transistor; means for providing first, second, third, and fourth bias potentials between the emitter electrode of said third transistor and first, second, third, and fourth terminals, respectively; first and second resistors coupled between said first terminal and the respective collector electrodes of said first and second transistors; a third resistor coupled between the collector electrode of said second transistor and the base electrode of said first transistor; a fourth resistor coupled between the collector electrode of said first transistor and the base electrode of said second transistor; a fifth resistor and a first diode coupled in series between said second terminal and the collector electrode of said third transistor; a sixth resistor coupled between the junction between said first diode and said fifth resistor and the base electrode of said second transistor; a second diode coupled between the collector electrode of said third transistor and said third terminal; a seventh resistor having one terminal coupled to the base electrode of said first transistor; an eighth resistor coupled between said fourth terminal and the other terminal of said seventh resistor; a transformer having a primary winding and a secondary winding; third and fourth diodes coupled between the respective ends of said secondary winding and said other terminal of said seventh resistor; a ninth resistor coupled between a tap on said secondary winding and the collector electrode of said third transistor; and pulsing means coupled to the base electrode of said third transistor and to the primary winding of said transformer for rendering said third transistor conductive causing said first and second transistors to assume a transient condition in which either one of said first and second transistors is capable of being rendered conductive and substantially simultaneously applying a trigger signal through said transformer to the base electrode of said first transistor such that said second transistor is rendered conductive if the magnitude of said trigger signal exceeds a preselected value and said first transistor is rendered conductive if the magnitude of said trigger signal does not exceed said preselected value.

References Cited by the Examiner

UNITED STATES PATENTS

| | | | |
|---|---|---|---|
| 2,898,479 | 8/59 | McElroy | 307—88.5 |
| 2,920,215 | 1/60 | Lo | 307—88.5 |

JOHN W. HUCKERT, *Primary Examiner.*

DAVID J. GALVIN, *Examiner.*

UNITED STATES PATENT OFFICE

CERTIFICATE OF CORRECTION

Patent No. 3,178,592 April 13, 1965

Charles H. Fischer et al.

It is hereby certified that error appears in the above numbered patent requiring correction and that the said Letters Patent should read as corrected below.

Column 4, line 49, strike out "in turn increase"; column 9, line 58, for "preselected value and said first" read -- transistors such that said second --.

Signed and sealed this 5th day of October 1965.

(SEAL)
Attest:

ERNEST W. SWIDER
Attesting Officer

EDWARD J. BRENNER
Commissioner of Patents